Feb. 2, 1971 T. TOVROG ET AL 3,559,463
VISCOMETERS
Filed June 2, 1969

INVENTORS
THEODORE TOVROG
BY & ARTHUR A. KRAWETZ
Bair, Freeman & Molinare
ATTORNEYS United States Patent Office 3,559,463
Patented Feb. 2, 1971

3,559,463
VISCOMETERS
Theodore Tovrog, Chicago, and Arthur A. Krawetz, Evanston, Ill., assignors to Phoenix Chemical Laboratory Inc., a corporation of Illinois
Filed June 2, 1969, Ser. No. 829,272
Int. Cl. G01n 11/04
U.S. Cl. 73—55                                    16 Claims

ABSTRACT OF THE DISCLOSURE

Viscometers for measuring the viscosity of liquids including volatile liquids comprise a pressure inlet tube communicating with a plenum and a measuring bulb and capillary also communicating with the plenum. When determining viscosity, the pressure is equalized between the bulb and the lower end of the capillary. A conduit may be provided to continuously divert a portion of a flowing liquid stream through the bulb and capillary to continuously purge the viscometer and monitor the stream. When the viscosity is to be measured, the diverted stream is interrupted and the pressure equalized both above the bulb and below the capillary and the viscosity of the purging liquid remaining in the bulb is determined. The liquid level in the plenum may be controlled within a predetermined range such that the capillary communicates with the plenum above the maximum liquid level and the liquid may be discharged from the plenum and returned to the flowing liquid stream.

BACKGROUND AND SUMMARY OF THE INVENTION

The present invention relates to apparatus and methods for determining the viscosity of liquids including liquids which are volatile or highly reactive in nature.

As set forth in our United States Letters Patent 3,434,-338, issued Mar. 25, 1969, certain difficulties are encountered where it is necessary to measure the viscosity of extremely volatile or unstable liquids. Such viscosity measurements must generally be made in an elevated pressure environment to avoid boiling and condensation or other detrimental side effects during the viscosity determination.

In addition, it is frequently advantageous if the viscosity of a continuously flowing liquid stream could be frequently, accurately and easily monitored without the necessity of elaborate measurement techniques and apparatus. Such stream monitoring becomes even more difficult where the liquid to be monitored is of a volatile or reactive nature as earlier mentioned.

The viscometers of our invention are capable of easily and accurately measuring the viscosity of volatile or highly reactive liquids without suffering from the aforesaid detrimental side effects resulting from boiling and the like and are simple in construction, as well as in use. The viscometers of our invention are capable of performing extremely rapid viscosity measurements and minimize the necessity of preliminary and tedious preparation steps which are usually necessary before viscosity determinations can be made, yet are extremely accurate in operation. According to certain forms of on-line type viscometers of our invention, viscosity determinations of continuously flowing liquid streams of liquid may be easily, rapidly and accurately determined with a minimum of preliminary preparation and the viscometers may be continuously purged and cleaned by the liquid between viscosity determinations, thus obviating the need for frequent cleaning. Moreover, the on-line viscometers of our invention may be employed in determining the viscosity of industrial production streams and yet are capable of providing viscosity measurements which are of the same order of accuracy as measurements realized by delicate laboratory instruments, which may be of the order of as little as 0.1% error. In addition, the portion of the liquid which is removed from the continuously flowing stream for monitoring in such on-line viscometers may be readily returned to the stream, thus minimizing the waste of liquid. Finally, each of the on-line viscometers of our invention is not only capable of rapidly and easily monitoring flowing liquid streams but also is capable of performing such monitoring function even where the liquid being monitored is of an extremely volatile or reactive nature.

These and other objects, features and advantages of the present invention will be more clearly understood through a consideration of the following detailed description.

BRIEF DESCRIPTION OF THE DRAWING

In the course of this description, reference will frequently be made to the attached drawing in which.

DESCRIPTION OF THE PREFERRED EMBODIMENTS

Figure 1:
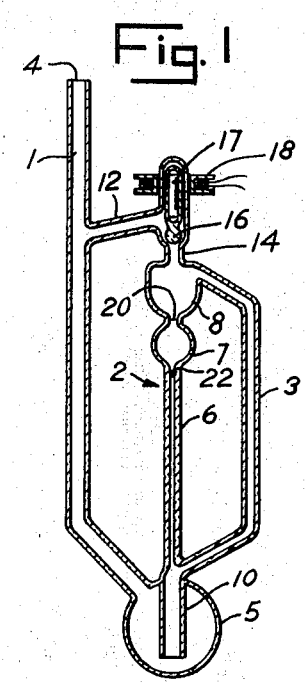
FIG. 1 is a cross-sectioned elevation view of one preferred embodiment of viscometer of our invention.

In FIG. 1 a preferred embodiment of viscometer is shown which is particularly adapted for measuring the viscosity of liquids which are extremely volatile or highly reactive. The viscometer comprises three tubes, a pressure inlet tube 1, a measuring section, generally 2, and an elongated equalizer tube 3. One end 4 of the pressure inlet tube 1 is adapted to be connected to a source of pressurized gas (not shown) and the other end communicates with a plenum 5.

The measuring section 2 comprises an elongated vertically upstanding capillary 6 which communicates at its upper end with lower and upper bulbs 7 and 8 which communicate with each other and at its lower end with a short tube portion 10 which extends into the plenum 5.

The elongated equalizer tube 3 is unrestricted and continuously communicates at its lower end with the plenum 5 and the bottom end of the capillary 6 via the short tube 10, and at its upper end with the upper bulb 8.

A passage 12 communicates via a short neck portion 14 between the upper end of the upper bulb 8 and the pressure inlet tube 1. A valve 16 is positioned in the passage 12 to selectively interrupt communication between the upper bulb 8 and inlet tube 1. The valve 16 may be of the electromagnetic type having a core 17 formed of a magnetic material and surrounded by a coil 18 to enable remote operation of the valve. Such remote operation is particularly advantageous where the liquid which is to be measured is hazardous to personnel. Operation of the valve 16 in no way restricts the communication of the elongated equalizer tube 3 between the upper bulb 8 and the lower end of the capillary 6.

In operation, the liquid, the viscosity of which is to be measured, is introduced into the cold apparatus through the pressure inlet tube 1 so as to substantially fill plenum 5. The liquid is introduced while the apparatus is cold to prevent undesirable vaporization prior to pressurization. A source of pressurized gas is then connected to the end 4 of the pressure inlet tube to pressurize the plenum at an elevated pressure. The pressure is selected to be such as to prevent boiling of the liquid where the liquid is of a volatile nature. The viscometer may now be introduced to a constant temperature bath or the like to bring the liquid to temperature equilibrium. When the plenum is pressurized and has reached temperature equilibrium and the valve 16 is closed, the pressure forces liquid up the capillary 6 and the equalizer tube 3 to fill the lower and upper bulbs 7 and 8. The diameter of the equalizer tube 3 is substantially larger than the diameter of the capillary 6 and since the equalizer tube is in addition unrestricted at all times, the liquid will flow upwardly through the equalizer tube more easily and rapidly than through the capillary so that the bulbs will rapidly fill via the latter tube. If the liquid is extremely viscous, the pressure may have to be slightly reduced and then increased several times in order to substantially fill the bulbs.

When the capillary 6 and the bulbs 7 and 8 have been substantially filled with the liquid, the pressure in pressure inlet tube 1 is reduced slightly to a predetermined value and valve 16 is opened. The predetermined pressure is selected to be such as to prevent boiling of the liquid if the liquid is volatile and may vary depending upon the volatility of the particular liquid. When the pressure is reduced and valve 16 is opened, the liquid in the capillary 6, in the bulbs 7 and 8, and in the equalizer tube 3 will commence to drain back to the plenum 5. Since the equalizer tube is of substantial cross-section and is unrestricted, the equalizer tube will rapidly drain empty before the liquid level in the upper bulb reaches the upper timing mark 20. As soon as the equalizer tube has drained, the pressure between the upper bulb 8 and the lower end of the capillary 6 will be equalized through the equalizer tube. In addition, the pressure throughout the entire system is equalized by the opening of valve 16.

The liquid in the measuring section 2 will continue to drain downwardly through the capillary into the plenum 5 at a substantially slower rate than the drainage which occurred through the equalizer tube 3. When the liquid level reaches the upper measuring mark 20, a stop watch or other timing device is started and the time which it takes the liquid level to reach the lower timing mark 22 is determined. This time measurement may then be used to calculate the viscosity of the liquid in the usual manner, the temperature of the liquid and the viscometer calibration constant being previously known.

It will be understood that the viscometer shown in FIG. 1, as well as the viscometers which will be described hereinafter, will be maintained at a substantially constant temperature level throughout the determination by immersion in a bath or the like in order to fix the temperature during the viscosity time measurement reading.

Valve 16 may be opened to assist in the cleaning and flushing of the viscometer between viscosity determinations. Although it is preferred that the valve 16 be opened when making viscosity determinations to insure pressure equilibration, the valve may be closed during the determinations if slight pressure differentials are tolerable.

Figure 2:
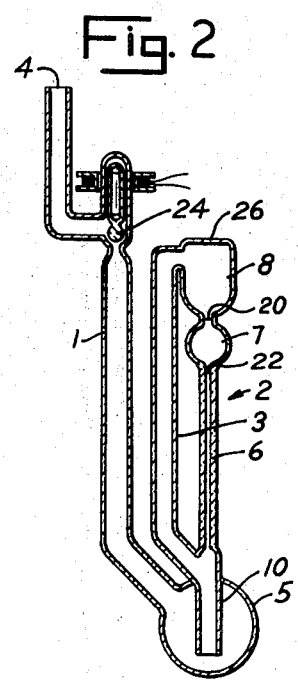
FIG. 2 is a cross-sectioned elevation view of a second preferred embodiment of viscometer of our invention.

In FIG. 2 another embodiment of viscometer of our invention is shown. The viscometer shown in FIG. 2 is similar in many respects to that shown in FIG. 1, and accordingly like reference numerals will be employed to describe like elements.

The viscometer of FIG. 2 differs from that of FIG. 1 in that a valve 24 has been included in the pressure inlet tube 1, the passage 12 communicating the inlet tube with the upper bulb, as well as its valve 16 have been eliminated, and the upper bulb 8 is sealed by an integrally formed one-piece wall 26 at its top.

In operation, valve 26 is opened and the liquid sample is introduced through the inlet line 1 to fill the plenum 5 as previously described. Where the liquid is volatile, the viscometer is pressurized to prevent boiling before the liquid is brought up to the equilibrium temperature. The liquid is forced upward through capillary 6 and equalizer tube 3 to substantially fill the bulbs 7 and 8 by introducing pressurized gas throguh the open valve 24 after temperature equilibrium is attained. When the capillary and bulbs have been filled, the pressure is reduced to the predetermined pressure and valve 24 is shut. Again, due to the large cross-section of the equalizer tube 3, the liquid will rapidly drain from the equalizer tube back to the plenum, equalizing the pressure between the upper bulb and the lower end of the capillary. When the liquid level in the measuring section 2 reaches upper timing mark 20, the time measurement is again begun and the viscosity measurement is determined as previously described.

Figure 3:
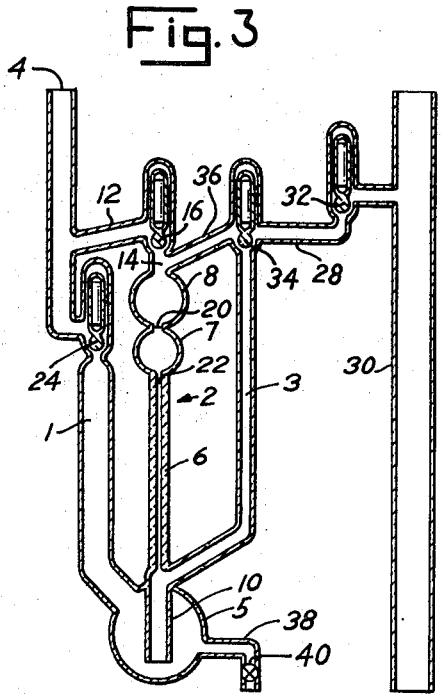
FIG. 3 is a cross-sectioned elevation view of a preferred embodiment of viscometer of our invention of the on-line type for easily and rapidly determining the viscosity of a continuously flowing liquid stream.
Figure 4:
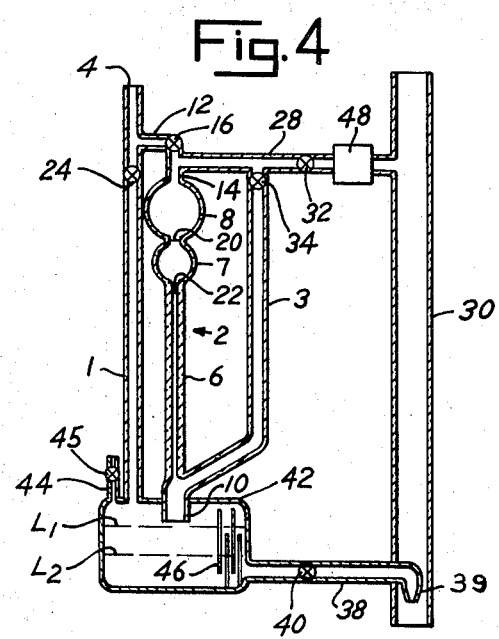
FIG. 4 is a cross-sectioned elevation view of another preferred embodiment of on-line viscometer of our invention.
Figure 5:
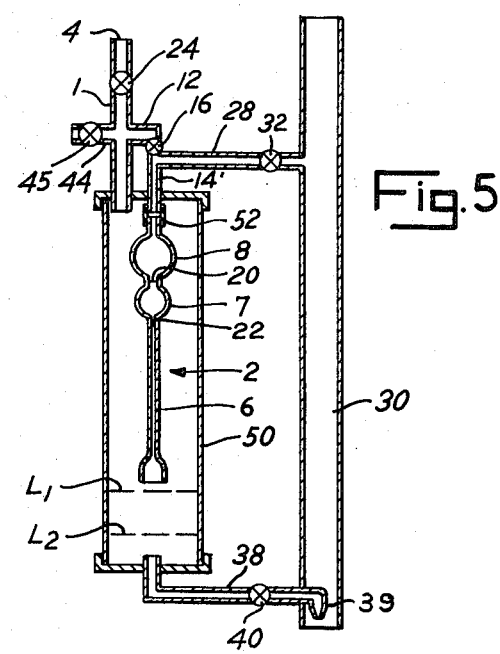
FIG. 5 is a cross-sectioned elevation veiw of still another preferred embodiment of on-line viscometer of our invention.

Three on-line viscometer embodiments are shown in FIGS. 3, 4 and 5 which are adapted to monitor the viscosity of a continuously flowing liquid stream. These viscometers may be employed to measure the viscosity of non-volatile as well as volatile liquids.

The viscometer shown in FIG. 3 includes a pressure inlet tube I having a control valve 24 for controlling the introduction of the pressurizing gas to the plenum 5 and the measuring section 2 comprises the pair of vertically arranged bulbs 7 and 8 which communicate with each other and the capillary 6 which communicates at its upper end with the lowermost bulb 7 and at its lower end with the short tubular portion 10 and the plenum 5 as described previously. The short neck portion 14 extends from the upper bulb 8 and the passage 12 communicates at one end with the pressure inlet tube upstream of valve 24 and at the other end with the neck through valve 16 as previously described with respect to FIG. 1.

A conduit 28 is provided which communicates at one end with the main 30 which carries a continuously flowing liquid stream which the viscometer is to monitor, and at the other end is connected with the neck 14. A valve 32 is provided in the conduit 28 to control the flow of a continuously diverted portion of the liquid stream to the viscometer from the main. The equalizer tube 3 communicates the lower end of the capillary 6 as before and the conduit 28 at point intermediate the bulb 8 and valve 32 and a valve 34 is provided to selectively interrupt communication between the equalizer tube and the conduit. The end 36 of the conduit adjacent the bulb 8 is preferably inclined somewhat to facilitate flow of the liquid from the conduit to the measuring section 2.

A discharge conduit 38, having a valve 40 or other flow regulating device therein, is connected to the plenum 5 for withdrawing an amount of liquid from the plenum to porvide for the continuous purging of the viscometer between viscosity determinations as will be more fully understood when considering the following description of the operation of the viscometer.

To commence operation, the valve 32 is opened and valves 16, 24 and 34 are closed. A portion of the liquid stream which is flowing in main 30 will thus be continuously diverted from the main and will flow through and purge the conduit 28, the bulbs 7 and 8, the capillary 6, the short tube 10, and the plenum 5 and will discharge through the discharge conduit 38 when valve 40 is open. Valve 24 may be rapidly cycled periodically, if necessary, to insure the maintenance of a slight gas head space in the plenum 5.

When a viscosity measurement is to be made, valve 32 is closed and valves 16 and 24 to the gas pressure source are opened. The pressure of the gas pressure source is preferably slightly greater than the pressure in main 30 or in any event great enough to provide for necessary movement of the liquid and, where the liquid is volatile to prevent vaporization of the liquid. In addition, valve 34 to the equalizer tube is opened to insure adequate pressure equalization between the upper bulb 8 and the lower end of the capillary 6. The liquid which has been continuously purging the measuring section 2 is representative of a recent main sample and, at this time, fills the bulbs and capillary. When the valves have been opened, the liquid in the measuring section begins to flow by gravity from the bulbs to the plenum. As before, when the liquid surface passes the upper timing mark 20, timing is commenced and when the surface passes the lower timing mark 22, timing is ceased, whereby the viscosity of the liquid may be readily determined.

As previously described, the equalizer tube 3 is of increased diameter enabling any liquid which may be present in the equalizer tube to drain to the plenum prior to the time that the liquid level of the liquid in the upper bulb reaches the upper timing mark and insures that the pressure between the upper bulb and the lower end of the capillary is readily equalized.

After the viscosity determination has been made, valves 16, 24 and 34 are closed and valve 40 and then valve 32 are opened to again commence the continuous diversion of a portion of the liquid stream in the main through the viscometer to continuously purge the viscometer. As soon as the bulbs 7 and 8 and capillary 6 have been refilled, another viscosity determination may be made if desired.

If it is desired to return the liquid sample to the main 30 after it passes through the viscometer, the discharge conduit 38 may be connected to the main, as shown in FIGS. 4 and 5. The discharge conduit 38 is preferably provided with a venturi tip 39 to provide for a slight aspiration effect. The discharge conduit is again preferably valved as shown and the valve 40 is open during purging. If it is necessary to prevent entry of the pressurizing gas into the main 30, the valve 40 may be closed during the viscosity determination.

Referring to FIG. 4, the viscometer construction is similar to that of FIG. 3, but the plenum 42 is of somewhat different construction. Plenum 42 is of sufficient volume to contain a level of the liquid such that the maximum level $L_1$ of the liquid lies below the lower end of the short tube 10 and the minimum level $L_2$ lies above the discharge conduit 38. In practice the levels $L_1$ and $L_2$ may be the same so long as the level is sufficient to allow for free unrestricted flow from the short tube 10 while maintaining a liquid seal between the tube 10 and the discharge conduit 38. The liquid level in the plenum may be adjusted between the maximum $L_1$ and the minimum level $L_2$ by the use of the pressure inlet tube valve 24 and a vent 44 having a valve 45 which communicates with the plenum 42. A series of separating baffles 46 may be provided at the discharge of the plenum to substantially reduce carryover of entrained pressurizing gas into the discharge conduit 38. A combination line filter, gas separator and heat exchanger 48 may be provided in conduit 28 to condition the sample for the viscosity measurement.

Preliminary to the viscosity determination, the system is continuously purged as previously described by opening valves 32 and 40, valves 16, 24, 34 and 45 being closed. The open valve 40 in discharge conduit 38 allows the purging liquid to continuously return to the main 30 between viscosity determinations.

Prior to commencing the viscosity determination, the level of the liquid in plenum 42 is adjusted such that it falls within the range between $L_1$ and $L_2$. If the level of the liquid in the plenum 42 is too high, a slight amount of gas may be admitted to the plenum through valve 24 to force some of the liquid through the discharge conduit 38. If the level of the liquid is too low, the valve 45 in vent 44 may be cycled to slightly reduce the pressure in the head space to thereby raise the level in the plenum. The liquid level in the plenum may be adjusted either, where the plenum is transparent, by visually observing the liquid level and manually manipulating valves 24 and 45, or automatically by the use of appropriate level sensors to manipulate the valves.

To commence the viscosity determination, valve 32 is closed and valve 34 is opened, draining any of the liquid which may be in the conduit 28 or the equalizer tube 3 to the plenum 42. When valve 32 is closed, the head pressure in the plenum will tend to equilibrate near the product stream pressure through the discharge conduit 38 and open valve 40. Valves 16 and 24 are then opened and valve 40 is closed. Again the pressure in the pressure inlet tube 1 is preferably slightly greater than the pressure of the liquid in the main. The viscosity determination is again made as previously described by timing the passage of the surface of the liquid between the timing marks 20 and 22.

Upon the completion of the viscosity determination, valves 16 and 24 are again shut and valves 32 and 40 are opened to resume the continuous purging of the viscometer as previously described.

In FIG. 5 another form of on-line monitoring viscometer is shown in which the equalizer tube and its valve have been eliminated and in which the measuring section 2 is completely enclosed within a cylindrical, preferably transparent vessel 50. The vessel performs the dual function of acting as the pressurizing and equalizing system and as the liquid plenum. In this embodiment, the passage 12 between the pressure inlet tube 1 and the upper bulb 8 communicates with the pressure inlet tube below valve 24. In addition, the vent 44 and valve 45 are relocated to the pressure inlet tube 1 also downstream of valve 24. The measuring section 2 is coupled to the neck portion 14' by a suitable coupling 52 such that the lower end of the capillary 6 is suspended above the maximum liquid level $L_1$. The liquid level in the bottom of the vessel 50 may be adjusted between the maximum and minimum levels $L_1$ and $L_2$ by the use of the vent valve 45 and pressure inlet valve 24, as previously described with respect to the embodiment of viscometer shown in FIG. 4.

In operation, the viscometer is continuously purged between viscosity determinations by a portion of the liquid which is diverted from the main 30, through open valve 32, conduit 28, neck 14', bulbs 7 and 8, and capillary 6 and collects in the lower end of vessel 50. A portion of the purging liquid is returned to the main through discharge conduit 38 and its open valve 40 to maintain the level of the liquid in the lower end of the vessel in the range between $L_1$ and $L_2$. During purging valves 16, 24 and 45 are shut.

To commence the viscosity determination the liquid level in vessel 50 is adjusted as previously described by manipulating valves 24 or 45 and valve 32 is then shut. If it is necessary to prevent passage of the pressurizing gas to the main, valve 40 is also shut during the viscosity determination. Valves 16 and 24 are now opened to introduce pressurized gas to the vessel 50 and to the top of the upper bulb 8, the pressure between the upper bulb and the lower end of the capillary being equalized through valve 16, pressure inlet tube 1, and vessel 50. Again the time is measured for the surface of the liquid in the bulbs to move between the two timing marks 20 and 22 and the viscosity is determined.

After the viscosity determination has been made, the system is again lined up to be continuously purged by shutting valves 16 and 24 and opening valves 32 and 40.

It will be appreciated that all of the aforesaid valves may take a variety of forms. If remote control of the viscometers is necessary, all of the valves may be electrically controlled in a manner similar to valves 16 and 24 in FIGS. 1 and 2 or may be otherwise remotely controlled such as by pneumatic or hydraulic devices. In additon, it will be readily appreciated that, although certain of the valves have been shown as being electrically controlled, any or all of the valves might be manually controlled.

It should also be understood that the embodiments of the present invention which have been described are merely illustrative of a few of the applications of the principles of the invention. Numerous modifications may be

What is claimed is:

1. Apparatus for measuring the kinematic viscosity of volatile liquids which includes a pressure inlet tube communicating with a liquid plenum, a measuring section including a capillary communicating at one end with the plenum and at the other end with a pair of vertically arranged interconnected bulbs, and an elongated tube communicating between the upper one of said bulbs and the pleum, the improvemet comprising in combination therewith:

sealing means for sealing the upper end of said upper bulb so that said upper bulb communicates only with said elongated tube and the lower one of said bulbs, and wherein said elongated tube is unresiricted and freely and directly communicates with said upper bulb at all times, whereby when the liquid in said plenum which is to be measured is pressurized, the liquid is introduced into said bulbs through said elongated tube.

2. The apparatus of claim 1 wherein said sealing means comprises a passage communicating between said pressure inlet tube and said upper bulb and valve means in said passage moveable to a position in which communication between said pressure inlet tube and said upper bulb is interrupted independent of the communication between said elongated tube and the upper bulb.

3. The apparatus of claim 1 wherein said sealing means comprises an impervious closed wall formed integral with said upper bulb and sealing the upper distal end thereof.

4. The apparatus of claim 1 including valve means in said pressure inlet tube.

5. Apparatus for measuring the kinematic viscosity of liquids which includes a pressure inlet tube communicating with a liquid plenum, a measuring section including a capillary communicating at one end with the plenum and at the other end with a pair of vertically arranged interconnected bulbs, an elongated tube communicating between the upper one of said bulbs and the plenum and a passage interconnecting the pressure inlet tube with the upper one of said bulbs and having a valve positioned therein, the improvement which comprises in combination therewith:

a valve seat in said passage between said elongated tube and said pressure inlet tube for sealing said passage without interrupting communication between said elongated tube and said upper bulb.

6. The apparatus of claim 5 including:

a conduit having one end thereof in communication with a main for carrying a stream of liquid the viscosity of which is to be monitored and the other end communicating with said upper bulb, said elongated tube communicating with said conduit, a second valve in said elongated tube for selectively interrupting the communication between said elongated tube and the conduit without interrupting the communication through said conduit between the main and said upper bulb, a third valve in said conduit between the main and the elongated tube for selectively interrupting communication between the main and said upper bulb, and discharge means for discharging liquid from said plenum.

7. The apparatus of claim 6 wherein said discharge means comprises a conduit communicating with the main, whereby the liquid in said plenum is discharged back to the stream.

8. Apparatus for measuring the kinematic viscosity of liquids in a liquid stream comprising:

a liquid plenum, a pressure inlet tube communicating with said plenum, a measuring section comprising a capillary communicating at one end with said plenum and at the other end with at least one bulb, a conduit communicating said bulb with the stream and having first valve means therein for selectively interrupting communication through said conduit, a passage communicating said bulb with said pressure inlet tube and having second valve means therein for interrupting communication between said inlet tube and bulb without interrupting communication between said conduit and bulb, and discharge means for discharging liquid from said plenum.

9. The apparatus of claim 8 including level control means for controlling the level of liquid within a predetermined range in said plenum such that said capillary communicates with the plenum above the maximum level of liquid in said plenum.

10. The apparatus of claim 9 wherein said level control means comprises third selectively operable valve means in said pressure inlet tube and selectively operable vent means communicating with said plenum.

11. The apparatus of claim 8 wherein said discharge means comprises a conduit which communicates with said stream whereby the liquid in said plenum is discharged back to said stream.

12. The apparatus of claim 11 wherein said plenum includes gas separator means to prevent passage of gas from the plenum to the stream.

13. The apparatus of claim 8 wherein said measuring section is enclosed with said plenum.

14. A method for selectively monitoring the kinematic viscosity of liquids in a continuously flowing liquid stream comprising:

continuously diverting a portion of the liquid from the stream and flowing said portion downwardly through the bulb and capillary to the plenum of a viscometer to continuously purge the viscometer, discharging liquid from the plenum so as to maintain the plenum at least partially filled with the purging liquid, interrupting said continuously diverted portion of the liquid, equalizing the pressure above the bulb with the pressure below the lowermost end of the capillary, and measuring the time needed for a given amount of the purging liquid remaining in the bulb to flow from the bulb through the capillary.

15. The method of claim 14 wherein the liquid is discharged from the plenum back to the stream and wherein said pressure is raised to above the pressure obtaining in said continuously flowing liquid stream.

16. The method of claim 14 including maintaining the liquid level in the plenum within a range such that the capillary communicates with the plenum above the maximum level of the liquid therein.

References Cited

UNITED STATES PATENTS

| | | | |
|---|---|---|---|
| 2,343,061 | 2/1944 | Irany | 73—55 |
| 2,805,570 | 9/1957 | Cannon | 73—55 |
| 3,434,338 | 3/1969 | Tovrog et al. | 73—55 |

FOREIGN PATENTS

| | | | |
|---|---|---|---|
| 175,724 | 12/1965 | U.S.S.R. | 73—55 |

LOUIS R. PRINCE, Primary Examiner

J. W. ROSKOS, Assistant Examiner